United States Patent
Kobayashi et al.

(10) Patent No.: US 6,506,320 B2
(45) Date of Patent: Jan. 14, 2003

(54) METHOD OF PREPARING COPRECIPITATED INORGANIC PARTICLES

(75) Inventors: Mikio Kobayashi, Tsukuba (JP); Yoshihiro Nishisu, Tsukuba (JP); Susumu Miyazaki, Ibaraki (JP)

(73) Assignees: Secretary of Agency of Industrial Science and Technology, Tokyo (JP); Sumitomo Chemical Company Limited, Osaka (JP)

( * ) Notice: Subject to any disclaimer, the term of this patent is extended or adjusted under 35 U.S.C. 154(b) by 30 days.

(21) Appl. No.: 09/725,211

(22) Filed: Nov. 29, 2000

(65) Prior Publication Data

US 2001/0017365 A1 Aug. 30, 2001

(30) Foreign Application Priority Data

Nov. 29, 1999 (JP) .......................................... 11-337827

(51) Int. Cl.[7] ................................................ C01F 17/00
(52) U.S. Cl. ............................... 252/301.4 R; 423/263
(58) Field of Search .................... 423/263; 252/301.4 R

(56) References Cited

U.S. PATENT DOCUMENTS

| | | | | |
|---|---|---|---|---|
| 3,449,259 A | * | 6/1969 | Ropp .................. | 252/301.4 R |
| 3,661,792 A | * | 5/1972 | Bertsch et al. ........ | 252/301.4 P |
| 3,870,650 A | | 3/1975 | Ferri et al. ............. | 252/301.4 |
| 4,497,785 A | * | 2/1985 | Tilley et al. ............ | 423/263 |
| 4,948,527 A | | 8/1990 | Ritsko et al. ........... | 252/301.4 |
| 5,413,736 A | | 5/1995 | Nishisu et al. .......... | 252/301.4 |
| 5,439,656 A | * | 8/1995 | Kimura et al. .......... | 423/21.1 |
| 5,637,258 A | | 6/1997 | Goldburt et al. ........ | 252/301.1 |
| 5,644,193 A | * | 7/1997 | Matsuda et al. ...... | 252/301.4 R |
| 5,662,831 A | | 9/1997 | Chadha .................. | 252/301.4 |
| 6,180,029 B1 | * | 1/2001 | Hampden-Smith et al. ......... | 252/301.4 R |
| 6,238,593 B1 | * | 5/2001 | Huguenin et al. .... | 252/301.4 R |

FOREIGN PATENT DOCUMENTS

JP                06-271316              9/1994

OTHER PUBLICATIONS

Nishisu et al, "Size and Shape Control of Precursor Particles of Eu3+–Doped Phosphor (Y2O3:Eu) Prepared From Homogeneous Solution by Using Nucleus Particle", Shigen– to–Sozai, vol. 115, No. 13, 1999, pp. 983–989.*

Nishisu et al., "Preparation of Spherical Particles Containing Yttrium/Europium from Homogeneous Solution", Shigen–to–Sozai, vol. 111, No. 3, 1995, pp. 191–196, with English Abstract.

Nishisu et al., "Size and Shape Control of Precursor Particles of $Eu^{3+}$–doped Phosphor ($Y_2O_3$ : Eu) prepared from Homogeneous Solution by Using Nucleus Particle", Shigen–to–Sozai, vol. 115, No. 13, 1999, pp. 983–989, with English Abstract.

* cited by examiner

Primary Examiner—C. Melissa Koslow
(74) Attorney, Agent, or Firm—Sughrue Mion, PLLC

(57) ABSTRACT

A method of preparing coprecipitated inorganic particles, including subjecting a first portion of an aqueous solution containing two or more metal ions to a coprecipitation reaction to form a liquid containing nucleus particles; mixing the nucleus particles-containing liquid with a second portion of the aqueous solution to form a mixture; and subjecting the mixture to a coprecipitation reaction to produce coprecipitated inorganic particles. The coprecipitated inorganic particles are calcined to obtain calcined inorganic particles having an average particle diameter of 0.5–10 $\mu$m.

7 Claims, No Drawings

METHOD OF PREPARING COPRECIPITATED INORGANIC PARTICLES

BACKGROUND OF THE INVENTION

This invention relates to a method of preparing coprecipitated inorganic particles, to calcined particles obtained from the coprecipitated inorganic particles, and to an inorganic phosphor containing the calcined particles.

There are many inorganic compounds containing rare earth element ions having peculiar characteristics. Such compounds are used as functional materials in a wide variety of fields such as electronics field. In order for the inorganic compounds to efficiently exhibit their effects, powder of such compounds is desired to have specifically controlled shape and particle distribution.

U.S. Pat. No. 5,413,736 discloses a fluorescent material of spherical particles of $Y_2O_3$ and $Eu_2O_3$ and having an average particle diameter of 0.09–0.21 μm. The fluorescent material is produced by heating an aqueous solution having a pH of 3 or less and containing a yttrium salt, a europium salt and urea at a temperature of at least 90° C. to coprecipitate particles, followed by calcination. Such small diameter particles, however, have problems with respect to the service life and handling.

SUMMARY OF THE INVENTION

It is, therefore, an object of the present invention to provide a simple method which can produce coprecipitated particles having controlled particle diameter and shape and which have solved the above problems of the prior art.

It is a special object of the present invention to provide a method which can produce a phosphor of $Eu^{3+}$-doped yttrium oxide spherical particles having a weight average particle diameter of 0.3–10 μm.

In accordance with one aspect of the present invention, there is provided a method of preparing coprecipitated inorganic particles, comprising the steps of:

(a) preparing an aqueous solution containing two or more metal ions;

(b) dividing said aqueous solution into first and second portions;

(c) subjecting said first portion to a coprecipitation reaction to form a liquid containing nucleus particles;

(d) mixing said nucleus particles-containing liquid with said second portion to form a mixture; and (e) subjecting said mixture to a coprecipitation reaction to produce coprecipitated inorganic particles.

In another aspect, the present invention provides a method of preparing coprecipitated inorganic particles, comprising the steps of:

(a) subjecting a first aqueous solution containing two or more metal ions to a coprecipitation reaction to form a liquid containing nucleus particles;

(b) mixing said nucleus particles-containing liquid with a second aqueous solution to form a mixture, said second solution containing the same metal ions as those of said first solution, wherein the relative amounts of said metal ions in said first and second solutions are substantially equal to each other; and (c) subjecting said mixture to a coprecipitation reaction to produce coprecipitated inorganic particles.

The present invention also provides calcined inorganic particles obtained by calcining coprecipitated inorganic particles obtained by the above methods. The calcined inorganic particles have an average particle diameter of 0.3–10 μm.

The present invention further provides a phosphor including the above calcined inorganic particles.

Other objects, features and advantages of the present invention will become apparent from the detailed description of the preferred embodiments of the invention to follow.

DETAILED DESCRIPTION OF THE PREFERRED EMBODIMENTS OF THE INVENTION

In one embodiment according to the present invention, coprecipitated inorganic particles are prepared from an aqueous solution containing two or more metal ions. Any metal or metalloid ions capable of being coprecipitated can be used for the purpose of the present invention. Examples of metals of the metal ions include Group Ib metals such as Cu, Ag and Au; Group IIa and IIb metals such as Mg, Ca, Sr, Ba, Zn, Cd and Hg; Group IIIa and IIIb metals such as Al, Ga, In, Tl, Sc and Y; Group IVa and IVb metals such as Si, Ge, Sn, Pb, Ti, Zr and Hf; Group Va and Vb metals such as as, Sb, Bi, V, Nb and Ta; Group VIa and VIb metals such as Cr, Mo, W and Se; Group VIIa metals such as Mn, Tc and Re, Group VIII metals such as Fe, Co, Ni, Ru, Rh, Pd, Os, Ir and Pt; lanthanide elements such as La, Ce, Pr, Nd, Pm, Sm, Eu, Gd, Tb, Dy, Ho, Er, Tm, Yb and Lu; and actinium elements such as Ac, Th, Pa, U, Np, Pu and Am.

The aqueous solution containing the metal ions (stock solution) may be obtained by dissolving salts of the metal ions in water. The relative amounts of the metal ions are the same as those of the relative amounts of the metals of the desired coprecipitated particles. A total concentration of the metal ions in the aqueous solution is generally 0.0005 to 0.5 mole/L, preferably 0.001–0.1 mole/L, more preferably 0.005–0.05 mole/L, most preferably 0.01–0.02 mole/L.

The aqueous solution is divided into first and second portions. The amount of the second portion is generally 1–50 parts, preferably 1–10 parts, more preferably 2–5 parts, per part of the first portion.

The first portion is subjected to a coprecipitation reaction to form a liquid containing nucleus particles. The coprecipitation reaction can be carried out in any known manner depending upon the metal ions used. It is preferred that urea be used as a precipitant. The amount of urea is generally 5–100 moles, preferably 20–80 moles, per mole of a total of the metal ions. Urea may be previously added to the stock solution or, if desired, to the first and/or second portions after separation from the stock solution.

The liquid containing nucleus particles thus produced is then mixed with the second portion. The mixture is subjected to a coprecipitation reaction to produce coprecipitated inorganic particles. If desired, the thus obtained reaction mixture is mixed with a third portion of the stock solution to further perform the coprecipitation reaction.

The coprecipitated particles are separated by, for example, filtration or centrifuge, dried and calcined. While the drying and calcining conditions may vary with the kind of the metal ions and the desired size of the particles, the drying temperature may be generally 40–150° C., preferably 60–100° C. and the calcination temperature may be generally at least 600° C., preferably 600–1500° C., more preferably 1000–1400° C. The calcination may be performed in an oxidating atmosphere such as air, an inert atmosphere such as nitrogen or argon or a reducing atmosphere such as hydrogen, depending upon the kind of the coprecipitated particles.

The process according to the present invention can produce calcined coprecipitated particles having a weight average particle diameter of 0.3–10 μm, especially 0.5–3 μm. The particle diameter can be changed by the coprecipitation conditions and number of repetition of the coprecipitation reaction. The calcined coprecipitated particles are generally spheres.

The present invention will now be described in detail with regard to the preparation of $Eu^{3+}$-doped yttrium oxide. First, an aqueous solution containing a yttrium salt, and a europium salt is prepared. As the yttrium salt, a yttrium halide, such as yttrium chloride ($YCl_3$), yttrium nitrate ($Y(NO_3)_3$) or a hydrate thereof is preferably used. As the europium salt, a europium halide, such as europium chloride ($EuCl_3$), europium nitrate ($Eu(NO_3)_3$) or a hydrate thereof is preferably used. Other salts may be used as long as they are soluble in water at a pH of 3 or less.

The amount of the yttrium compound relative to that of the europium compound is not specifically limited and is suitably selected according to the end use. Generally, the yttrium and europium compounds are used in such an amount as to provide an atomic ratio Y/Eu of 9.5:0.5 to 0.5:9.5, namely such an amount that the fluorescent material produced has a composition of $(Y_{1-x}, Eu_x)_2O_3$ wherein x is a number of between 0.05 and 0.95. The pH of the aqueous solution is generally adjusted to 3 or less, preferably 2–3, by addition of an acid such as hydrochloric acid, nitric acid, sulfuric acid. In the aqueous acid solution urea may be added as a precipitant. The amount of urea is generally 5–100 moles, preferably 20–80 moles, per mole of a total of the yttrium and europium compounds.

The aqueous solution as a feedstock is divided into first and second portions such that the amount of the second portion is generally 1–50 parts, preferably 1–10 parts, more preferably 2–5 parts, per part of the first portion.

The first portion of the feedstock is reacted at a temperature of 60–80° C. for 10–30 minutes with stirring to obtain a liquid containing nucleus particles. Then, the second portion of the feedstock is mixed to the nucleus particles-containing liquid. The resulting mixture is reacted at a temperature of 60–80° C. for 30–100 minutes with stirring and then at a temperature of 90° C. or more for 30–60 minutes with stirring to obtain grown coprecipitated particles. The above reaction time and temperature are not restrictive but only illustrative. The reaction is generally continued until the pH of the reaction mixture increases to 7 or more, preferably 7.5–8.5. When the coprecipitation is carried out under a pressurized condition, the reaction temperature higher than 100° C. can be used.

The precipitates thus obtained are separated from the reaction mixture by filtration, centrifuge or the like solid-liquid separation method and washed several times with water by, for example, a combination of dispersion into water by an ultrasonic method with solid-liquid separation. Such a procedure of dispersion and succeeding solid-liquid separation is preferably repeated 2–6 times. The thus obtained precipitates are then dried to obtain particles of a composite of $YOHCO_3$ and $EuOHCO_3$ and having an average particle diameter of generally about 1–2 μm with a narrow particle diameter distribution of, for example, about ±0.5 μm. Before the drying step, it is preferred that the wet particles obtained in the water-washing step be dispersed in an organic solvent such as an alcohol, followed by solid-liquid separation, to substitute the organic solvent for the impregnated water, for the purpose of preventing agglomeration of the particles.

The dried particles are then calcined at a temperature of generally at least 600° C., preferably 800–1,400° C., to form spheres of $Y_2O_3$ and $Eu_2O_3$. The calcination may be performed in air. The thus obtained spherical particles have an average particle diameter of generally about 1–2 μm with a narrow particle diameter distribution of, for example, about ±0.5 μm. The $Eu^{3+}$-doped yttrium oxide particles emit red fluorescence by excitation with vacuum ultraviolet rays and is useful as a red phosphor for vacuum UV (147 nm) excitation element or as a three band fluorescent (254 nm) lamp.

In the above-described embodiment, the stock solution is divided into first and second portions. It is without saying that a portion of the stock solution can be used for providing the first and second portions. Further, the first and/or second portions may be diluted with water or may be mixed with a precipitant or pH controlling agent before the coprecipitation reaction.

In an alternative embodiment, two first and second aqueous solutions each containing two or more metal ions are separately produced. The first solution contains the go same kind of metal ions as those of the second solution. The relative amounts of the metal ions in the first solution are substantially the same as those in the second solution. However, it is not necessary that the total concentration of the metal ions in the first solution be the same as that in the second solution. The first aqueous solution is subjected to coprecipitation to form a liquid containing nucleus particles. The liquid thus obtained is mixed with the second aqueous solution and the mixture is subjected to coprecipitation to produce coprecipitated inorganic particles. The total metal ion concentration of each of the first and second aqueous solutions may be suitably selected from the range described with reference to the stock solution in the previous embodiment. The proportion of the first and second aqueous solutions may be such that the ratio of the total metal ion concentration of the first aqueous solution to the total metal ion concentration of the second aqueous solution.is generally 1:1 to 1:50, preferably 1:1 to 1:10, more preferably 1:2 to 1:5.

According to the present invention, particles of inorganic compounds containing two or more metals can be obtained. The inorganic particles may be inorganic phosphors, such as Eu/Y phosphor, Y/Gd/Eu phosphor, Y/V/Eu phosphor, Y/Tb phosphor and Y/Gd/Tb, and inorganic catalysts such as two or more transition elements containing catalyst (e.g. Ni/Mo catalyst).

The following examples will further illustrate the present invention.

EXAMPLE 1

Into 900 ml of pure water were dissolved 2.6 g of $YCl_3 \cdot 6H_2O$ (purity: above 99.9%), 0.16 g of $EuCl_3 \cdot 6H_2O$ (purity: above 99.9%) and 27 g of urea, and the solution was adjusted to pH 2.5 with hydrochloric acid and allowed to quiescently stand at room temperature for 24 hours to obtain a stock solution. A portion (first portion) of the stock solution was heated at 77° C. for 20 minutes with stirring, to which a second portion of the stock solution was added in an amount of 2 times the weight of the first portion. The mixture was then heated at 77° C. for 60 minutes with stirring and then at 97° C. for 40 minutes with stirring to form precipitates. The precipitates were separated by centrifuge and dispersed in water using ultrasonic wave. Such separation and dispersion treatments were repeated four times. The washed precipitates were separated from the aqueous dispersion by centrifuge and dispersed into isopropanol by an ultrasonic method. The precipitates were then separated, dispersed in isopropanol, separated by decantation, and dried under vacuum to obtain dried coprecipitated particles. The transmission electron microscope (TEM) reveals that the particles are spherical and have an average particle diameter of about 1 μm.

The dried particles obtained were calcined at 850° C. for 1 hour in air to obtain calcined particles having an average particle diameter of about 1 μm (by TEM analysis). The X-ray diffraction analysis (CuKα) revealed that the calcined particles had a single phase forming a solid solution of europium and yttrium oxide. When irradiated with UV light having a wavelength of 254 nm, the particles emit strong, red fluorescence having a wavelength of 611 nm. When irradiated with vacuum UV light (146±10 nm) in vacuum ($3 \times 10^{-2}$ mmHg) with an excimer lamp, the particles emit strong red fluorescence.

COMPARATIVE EXAMPLE 1

Into 900 ml of pure water were dissolved 2.6 g of $YCl_3 \cdot 6H_2O$ (purity: above 99.9%), 0.16 g of $EuCl_3 \cdot 6H_2O$ (purity: above 99.9%) and 27 g of urea, and the solution was adjusted to pH 2.5 with hydrochloric acid and allowed to quiescently stand at room temperature for 24 hours to obtain a solution. The solution was then heated at 97° C. for 60 minutes with stirring to form precipitates. The precipitates were separated by centrifuge and dispersed in water using ultrasonic wave. Such separation and dispersion treatments were repeated four times. The washed precipitates were separated from the aqueous dispersion by centrifuge and dispersed into isopropanol by an ultrasonic method. The precipitates were then separated, dispersed in isopropanol, separated by decantation, and dried under vacuum to obtain dried coprecipitated particles. The transmission electron microscope (TEM) reveals that the particles are spherical and have an average particle diameter of about 0.1 μm.

What is claimed is:

1. A method of preparing coprecipitated inorganic particles, comprising the steps of:
    (a) preparing an aqueous solution containing two or more metal ions;
    (b) dividing said aqueous solution into first and second portions;
    (c) subjecting said first portion to a coprecipitation reaction to form a liquid containing nucleus particles wherein said coprecipitation reaction is performed in the presence of urea;
    (d) mixing said nucleus particles-containing liquid with said second portion to form a mixture; and
    (e) subjecting said mixture to a coprecipitation reaction to produce coprecipitated inorganic particles wherein said coprecipitation reaction is performed in the presence of urea.

2. A method as claimed in claim 1, wherein said metal ions include ions of at least one rare earth element.

3. A method as claimed in claim 1, wherein said metal ions include yttrium ions and europium ions.

4. A method of preparing coprecipitated inorganic particles, comprising the steps of:
    (a) subjecting a first aqueous solution containing two or more metal ions to a coprecipitation reaction to form a liquid containing nucleus particles wherein said coprecipitation reaction is performed in the presence of urea;
    (b) mixing said nucleus particles-containing liquid with a second aqueous solution to form a mixture, said second solution containing the same metal ions as those of said first solution, wherein the relative amounts of said metal ions in said first and second solutions are substantially equal to each other; and
    subjecting said mixture to a coprecipitation reaction to produce coprecipitated inorganic particles wherein said coprecipitation reaction is performed in the presence of urea.

5. A method as claimed in claim 4, wherein said metal ions include ions of at least one rare earth element.

6. A method as claimed in claim 4, wherein said metal ions include yttrium ions and europium ions.

7. A method as claimed in claim 4, wherein the amount of said second solution is 1–50 parts per part of the first solution.

* * * * *